United States Patent Office 3,364,267
Patented Jan. 16, 1968

3,364,267
PROCESS FOR PREPARATION OF GLYCOL ETHERS OF PHENOLS
Lee H. Horsley, Midland, Mich., assignor to The Dow Chemical Company, Midland, Mich., a corporation of Delaware
No Drawing. Filed Nov. 8, 1965, Ser. No. 506,893
6 Claims. (Cl. 260—613)

This invention relates to improved processes for preparing monoaryl ethers of 1,2-alkylene glycols by the reaction of a phenol with a vicinal alkylene oxide.

It is known to react a phenol with an alkylene oxide by use of either acidic or basic catalysts. The products are mixtures, the components of which differ primarily in the number of oxyalkylene groups included therein. No practical method has heretofore been found whereby a phenol can be condensed with a single molar equivalent of an alkylene oxide to produce only the corresponding 2-hydroxyalkyl aryl ether to the substantial exclusion of polyoxyalkylene ethers.

According to the invention, a phenol is condensed with an alkylene oxide to produce the corresponding aryl 2-hydroxyalkyl ether in high yield and purity and with minimum formation of polyoxyalkylene compounds by conducting the reaction under the following critical conditions:

(1) The catalyst is a strong sodium or lithium base; e.g., the hydroxide or phenate, it being a further requirement that when the catalyst is a sodium compound, at least about 4, and preferably about 6 moles of water per mole of catalyst must be present.

(2) A substantial excess of alkylene oxide over phenol must be present; e.g., a minimum of at least about 3 moles per mole of phenol should be used.

(3) The reaction temperature should not be above about 125° C., and preferably not above about 100° C.

As to the catalyst, it has been thought heretofore that the alkali metal bases are all substantially equivalent in their activity; i.e., that LiOH and KOH, for instance, are equivalent. To the contrary, it has now been found that the lithium bases are much more selective to produce 2-hydroxyalkyl aryl ethers, that sodium bases are selective if used in the presence of 4–8 moles of water, and that potassium and cesium bases are essentially non-selective, even when used with water. It is believed that the catalytic species is the Li or Na phenate. These may be added as such to the reaction mixture or they may be formed in situ by the reaction of the alkali metal, hydroxide, alcoholate or the like with the phenol. For this reason, the catalysts are referred to hereinafter as the phenates and this term is to be taken as including these equivalent materials.

When the catalyst is sodium phenate, the desirable selectivity is very weak unless some water is present. A minimum of about 4 moles, based on the catalyst, is needed for adequate selectivity and about 6 moles is usually the optimum. Amounts in excess of about 8–10 moles are usually of little or no additional advantage. The necessary water need not be added as such but may be in the reactants. Thus, if NaOH is used as the catalyst it largely reacts with the phenol to produce the phenate and one mole of water. Also, the use of hydrated alkali or phenol can supply the requisite water.

The requirement that excess alkylene oxide be present in the reaction zone is directly contrary to the teachings of the prior art, it having been common practice heretofore to attempt to minimize the formation of polyoxyalkylene compounds by limiting the proportion of alkylene oxide to substantially one mole per mole of phenol, or even to use an excess of phenol. This inevitably results in the presence of unreacted phenol in the product. This phenol is highly objectionable, even in concentrations of only a few tenths of one percent, for many uses of the product. It has now been found that excess oxide actually inhibits the formation of polyoxyalklene compounds and that if at least about 3 moles of oxide are used per mole of phenol, very little polyoxyalkylene product is produced. Even higher ratios are advantageous, though when the ratio exceeds about 10:1 the disadvantages inherent in handling and recycling such large excesses outweigh the advantage of improved selectivity.

The selectivity of the reaction, i.e., the tendency to produce the desired product to the substantial exclusion of undesired byproducts, decreases as the reaction temperature is raised until, at temperatures above about 125° C., little selectivity remains over and above that accomplished by the prior art. On the other hand, temperatures below about 80° C., result in such low rates of reaction that the process becomes uneconomical. The preferred temperature is usually about 90–110°.

The reaction is carried out in the liquid phase, thus requiring a closed system and a superatmospheric pressure at least equal to the autogenous pressure. At least 3 moles of oxide per mole of phenol should be put in initially. When one mole of oxide per mole of phenol has reacted, the reaction becomes very slow and should not be unduly prolonged beyond this point because polyoxyalkylene compounds are then produced. Typically, this point is reached after a reaction period of 1–24 hr., depending on reactants and conditions.

The practice of the invention is illustrated by the following examples.

*General procedure*

A mixture of 0.01 mole of the phenol and the indicated proportions of alkylene oxide and catalyst was sealed in a glass tube under a nitrogen atmosphere and the tubes were agitated in a water bath during the reaction period. They were then cooled, opened and the contents analyzed by VPC.

TABLE I.—EFFECTS OF CATALYST ON REACTION OF PROPYLENE OXIDE AT 105–110° C.

| Ref. | Example | Phenol [1] | Mole Ratio Oxide/Phenol | Catalyst | Mole Ratio Cat./Phenol | Time, hr. | Phenol Consumed, percent | Mole Ratio, Mono/Poly [2] |
|---|---|---|---|---|---|---|---|---|
| 14c | 1 | φOH | 6 | Liοφ | 0.06 | 20.5 | 98.7 | 27 |
| 19c | 2 | φOH | 6 | LiOφ [3] | 0.06 | 20.5 | 99.1 | 24 |
| 21c | 3 | φOH | 6 | NaOφ | 0.06 | 20.5 | 99.7 | .09 |
| 26c | 4 | φOH | 6 | NaOφ [3] | 0.06 | 20.5 | 100 | 2.4 |
| 27c | 5 | φOH | 6 | NaOφ [4] | 0.06 | 20.5 | 100 | 2.9 |
| 28c | 6 | φOH | 6 | KOφ | 0.06 | 23.5 | 100 | 0.00 |
| 34c | 7 | φOH | 6 | KOφ [4] | 0.06 | 23.5 | 100 | .01 |
| 22b | 8 | o-Sec-Bu-φOH | 8 | LiOH·H$_2$O | .08 | 20.5 | 98.7 | 150 |
| 24b | 9 | o-Sec-Bu-φOH | 8 | NaOCH$_3$ | .08 | 20.5 | 100 | .05 |
| 27b | 10 | o-Sec-Bu-φOH | 8 | NaOCH$_3$ [5] | .08 | 20.5 | 98.7 | 60 |
| 10c | 11 | o-Sec-Bu-φOH | 8 | KOH | .06 | 23.5 | 100 | .00 |
| 13c | 12 | o-Sec-Bu-φOH | 8 | KOH [4] | .06 | 23.5 | 97.4 | .06 |

[1] φ represents the phenyl residue.
[2] "Mono" and "Poly" refer to the aryl monoethers of mono- and polyalkylene glycols, respectively.
[3] Added 6 moles of water per mole of catalyst.
[4] Added 7 moles of water per mole of catalyst.
[5] Added 4 moles of water per mole of catalyst.

Table I shows the effects of various catalysts, both within and outside the invention.

Table II shows the results of some typical experiments in which various phenols and oxides were used under various conditions, the catalyst being LiOH·H₂O.

TABLE II

| Ref. | Example | Phenol | Alkylene Oxide¹ | Mole Ratio Oxide/Phenol | Mole Ratio Cat./Phenol | Temp., °C. | Time, hr. | Phenol Consumed, Percent | Mole Ratio, Mono/Poly |
|---|---|---|---|---|---|---|---|---|---|
| 45c | 13 | 2,4-dichloro | EO | 8 | 0.08 | 105 | 17 | 100 | 1.4 |
| 52c | 14 | ----do---- | EO | 8 | 0.08 | 80 | 20 | 100 | 7.2 |
| 65c | 15 | ----do---- | EO | 8 | 0.08 | 80 | 5 | 95.2 | 79 |
| 66a | 16 | ----do---- | PO | 4 | .04 | 100 | 23 | 100 | 15.8 |
| 84a | 17 | o-Chloro | PO | 4 | .04 | 100 | 19 | 99.4 | 28 |
| 78a | 18 | p-Chloro | PO | 4 | .04 | 100 | 19 | 99.3 | 12.6 |
| 98b | 19 | α-Naphthol | PO | 4 | .04 | 100 | 23 | 100 | 58 |
| 90b | 20 | β-Naphthol | PO | 4 | .04 | 100 | 20 | 100 | 48 |
| 88a | 21 | Phenol | PO | 1 | .04 | 100 | 18.5 | 97.6 | 107 |
| 89a | 22 | ----do---- | PO | 2 | .04 | 100 | 18.5 | 99.7 | 8.1 |
| 90a | 23 | ----do---- | PO | 4 | .04 | 100 | 18.5 | 100 | 21 |
| 92a | 24 | ----do---- | PO | 6 | .04 | 100 | 18.5 | 100 | 46 |

¹EO and PO represent ethylene and 1,2-propylene oxides, respectively.

Results similar to those shown above are obtained when butylene oxide is used instead of ethylene oxide or propylene oxide, the selectivity being similar to that obtained with propylene oxide. Likewise, similar results are obtained with other phenols, such as halophenols, alkylphenols, haloalkylphenols, diphenols, bisphenols and the like and the corresponding polynuclear phenols, such as the naphthols. In general, the process of the invention is applicable to the oxyalkylation of any oxyalkylation-susceptible phenolic compound.

I claim:
1. In a process for producing an aryl 2-hydroxyalkyl ether by the reaction of a phenol with a vicinal alkylene oxide, the improvement of reacting by contacting the phenol with at least 3 molar equivalents of an alkylene oxide at a temperature of 80–125° C. and in the presence of a catalyst selected from the group consisting essentially of a lithium phenate and a sodium phenate, and, when the catalyst is a sodium phenate, of at least 4 moles of water per mole of catalyst.
2. The process of claim 1 wherein the phenol is phenol.
3. The process of claim 1 wherein the catalyst is the lithium phenate.
4. The process of claim 1 wherein the reaction temperature is 90–110° C.
5. The process of claim 1 wherein the alkylene oxide contains 2–4 carbon atoms.
6. The process of claim 2 wherein the catalyst is lithium phenate and the alkylene oxide is 1,2-propylene oxide.

References Cited

UNITED STATES PATENTS 2,782,240  2/1957  Hefner et al. _____ 260—613

FOREIGN PATENTS 519,730  3/1931  Germany.
736,991  9/1955  Great Britain.

BERNARD HELFIN, *Primary Examiner.*